United States Patent [19]

Garrison

[11] Patent Number: 4,466,567
[45] Date of Patent: Aug. 21, 1984

[54] METHOD FOR BRAZE-JOINING SPIRALLY WOUND TAPES TO INNER WALLS OF HEAT EXCHANGER TUBES

[75] Inventor: Melton E. Garrison, Powell, Tenn.

[73] Assignee: The United States of America as represented by the United States Department of Energy, Washington, D.C.

[21] Appl. No.: 414,545

[22] Filed: Sep. 3, 1982

[51] Int. Cl.³ .............................................. B23K 31/02
[52] U.S. Cl. .................................. 228/183; 228/246; 228/247; 29/157.3 R
[58] Field of Search ............... 228/246, 247, 245, 183; 165/109 R, 109 T; 138/38, 37, 42, 115; 29/157.3 R

[56] References Cited

U.S. PATENT DOCUMENTS 3,139,679  7/1964  Saj ................................... 29/157.3 R
3,948,431  4/1976  Niimi et al. ..................... 228/245 X
4,163,474  8/1979  MacDonald et al. ..... 29/157.3 R X

FOREIGN PATENT DOCUMENTS 1410086  10/1975  United Kingdom ............... 228/183

Primary Examiner—Nicholas P. Godici
Assistant Examiner—P. Weston Musselman, Jr.
Attorney, Agent, or Firm—Earl L. Larcher; Stephen D. Hamel; Michael F. Esposito

[57] ABSTRACT

The present invention is directed to a method of fabricating heat exchanger tubes in which twisted tapes are utilized for promoting turbulence and heat transfer. The method of the present invention provides for the brazing of the tapes to the inner walls of the tubes for enhancing heat transfer between the fluid within the conduit and a fluid medium outside of the conduit by conduction through the tape. The braze joint of the present invention is coextensive with the tape over the entire length thereof within the conduit. The practice of the present invention is achieved by placing a filler wire of brazing metal along the tape at a location removed from the side walls and then heating the conduit and tape sufficiently to effect the displacement of the filler metal by wicking to the contact point between the tape and the conduit wall to form a braze joint coextensive with the length of the tape within the conduit. This arrangement provides maximum heat transfer and assures that the tape is in contact with the conduit over the entire common length thereof.

4 Claims, 5 Drawing Figures

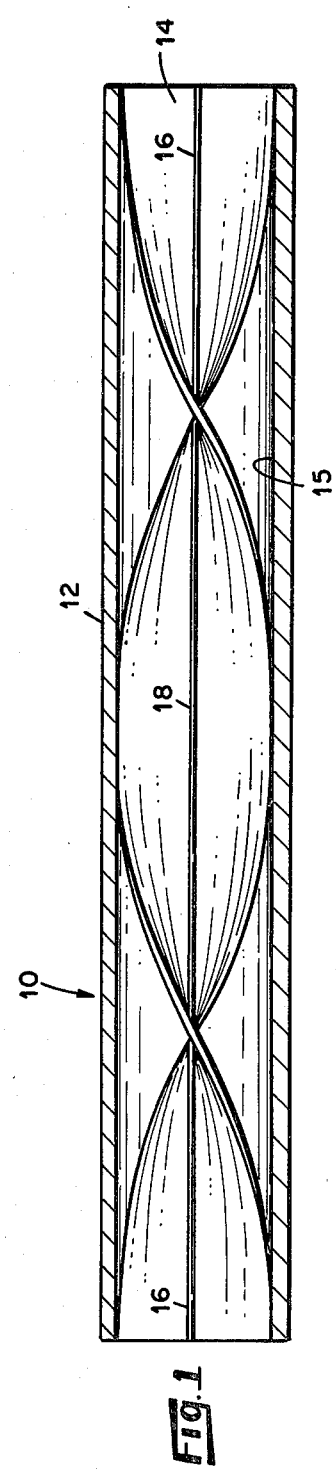
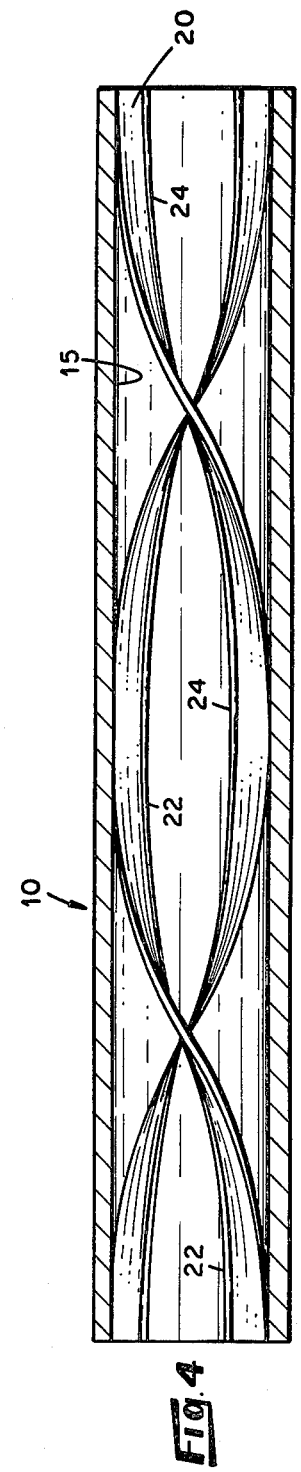
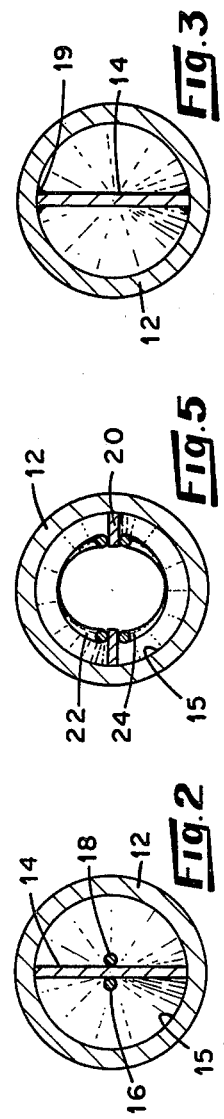

METHOD FOR BRAZE-JOINING SPIRALLY WOUND TAPES TO INNER WALLS OF HEAT EXCHANGER TUBES

This invention was made as a result of a contract with the U.S. Department of Energy.

BACKGROUND OF THE INVENTION

The present invention is directed to the art of fabricating heat exchanger tubes or conduits that are provided with twisted tapes for promoting turbulent flow within the tubes for enhancing heat exchange properties and, more particularly, to a method for brazing the twisted tapes to the walls of the tubes for increasing the heat transfer from the fluid within the tubes to the tube walls.

Heat exchangers are conventionally fabricated by positioning a plurality of tubes within a housing and then passing a fluid through the tubes to effect heat transfer from the fluid within the tubes to a fluid medium surrounding the tubes or the converse thereof.

The efficiency of the heat exchangers has been significantly increased by generating turbulent flow within the heat-exchanger tubes for enhancing the heat transfer from the fluid within the tubes to the tube walls. This turbulent flow is provided by inserting convoluted or twisted tapes in the passageways within the tubes. The heat transfer between the fluid within the tubes and the tube walls is also provided by conduction through the twisted tapes to the tube walls. To provide this conductive heat transfer the edges of the twisted tapes are joined to the inner walls of the tubes by brazing or the like.

By practicing known techniques for brazing the twisted tapes to the inner walls of the tubes, folds and powder of the filler metal are placed at various locations along the tube so that only spot brazing occurs over the length of the tape within the tube. Thus, any increase in heat transfer by conduction is somewhat minimal in that insufficient contact is established between the twisted tape and the tube wall to provide the desired extent of heat transfer.

SUMMARY OF THE INVENTION

Accordingly, it is the primary objective or aim of the present invention to provide a method for brazing the twisted tapes to the inner walls of heat exchanger tubes in such a manner as to provide a continuous joint between the tape and the heat exchanger tube over the entire common length thereof. Generally, the heat exchange structure is conventionally formed of a metal conduit or tube containing therein an elongated convoluted metal tape in which the peripheral surfaces thereof are disposed in a contiguous relationship to the inner wall surface of the conduit. In accordance with the method of the present invention, the tape is brazed to the inner walls of the tube over the entire common length thereof by providing the convoluted tape with an elongated wire of the brazing filler metal coextensive with the tape at a location contiguous with the innermost surface or central axis of the tape. The tape and the filler metal are inserted into the tube and then heat of a sufficient level is applied to the tube and tape to melt the filler metal and effect the displacement of the filler metal by capillary attraction to the peripheral edges of the tape to position the braze material along the entire length of the tape. Upon the termination of the heating, the filler metal solidifies to effect the joining of the tape to the inner wall of the tube over the common length thereof. This metal-to-metal contact increases the heat conduction from the fluid within the tube to the walls of the tube. The present invention may be utilized to braze twisted tapes having a solid or open core with desired results obtained in either case.

Other and further objects of the invention will be obvious upon an understanding of the illustrative embodiments about to be described or will be indicated in the appended claims, and various advantages not referred to herein will occur to one skilled in the art upon employment of the invention in practice.

DESCRIPTION OF THE DRAWINGS

FIG. 1 is a sectional view showing a twisted tape with a solid core disposed within a heat exchanger tube with the filler metal in place prior to the brazing operation;

FIG. 2 is an end view of the FIG. 1 embodiment showing the filler metal disposed on opposite sides of the tape adjacent the center of the tape over the length thereof;

FIG. 3 is an end view of the FIG. 1 embodiment showing the filler metal joint between the tape and the inner wall of the heat exchanger tube;

FIG. 4 is another embodiment of the invention showing the tape having a hollow core disposed within a heat exchanger tube with the brazing filler metal positioned at the innermost peripheral surfaces of the tape prior to the brazing operation; and FIG. 5 is an end view of the FIG. 4 embodiment showing the position of the filler metal prior to the brazing operation.

Preferred embodiments of the invention have been chosen for the purpose of illustration and description. The preferred embodiments illustrated are not intended to be exhaustive or to limit the invention to the precise forms disclosed. They are chosen and described in order to best explain the principles of the invention and their application in practical use to thereby enable others skilled in the art to best utilize the invention in various embodiments and modifications as are best adapted to the particular use contemplated.

DESCRIPTION OF THE INVENTION

As briefly described above, the present invention is directed to a method for fabricating tube-containing heat exchangers in which serpentine or twisted tapes are disposed within the heat exchanger tubes for promoting turbulence within the fluid contained within the tubes in order to enhance heat transfer between the fluid within the tubes and the fluid surrounding the tubes. The invention promotes the heat transfer to or from the fluid within the tubes by brazing the twisted tapes to the walls of the tubes thereby increasing the thermal conductivity of the fluid within the tubes to the tube walls. The advantages of the present invention are achieved by brazing the twisted tapes to the walls of the tubes in such a manner that a continuous metal-to-metal bond is provided over the common length of the tapes and tubes.

As shown in FIGS. 1-3 the heat exchanger tube as generally indicated by the numeral 10 comprises an elongated tube 12 containing an elongated twisted tape 14. This tape 14 is of a solid core type in which the heat transfer fluid travels in a serpentine path within the passageways defined by the tape and the inner wall 15 of the tube for effecting the turbulent motion in the fluid and the resulting heat exchange between the fluid within the tube and a heat exchange medium (not shown) external of the tube. The brazing of the tape 14 to the inner wall 15 of the tube is provided by placing elongated wires 16 and 18 of the filler metal on opposite sides of the tape as generally shown in FIG. 2. These filler wires are disposed along the center of the tape over the entire length thereof in FIG. 1. This brazing filler metal is preferably placed along the center line of the tape prior to insertion of the tape into the tube 12.

After the tape and the brazing filler metal wire are inserted into the tube, the latter and the tape are sufficiently heated to melt the filler metal which then flows by capillary attraction of the tube base metal from the central area of the tapes to the point of contact between the peripheral edges of the tapes and the inner wall 15 of the tube 12. This wicking action of the molten filler metal to the joint area provides a continuous layer 19 (FIG. 3) of brazing material that is coextensive with the tape within the heat exchanger tube. The solidification of the filler metal upon terminating the heating operation provides a solid, rigid, metal-to-metal bond between the twisted tape and the wall of the tube to provide the desired heat transfer by conduction through the tape and the walls.

The particular materials utilized for the tube and the tape may be those as employed in conventional heat exchangers such as copper and copper alloys. The brazing material used is a low-melting material such as 60 wt. % Ag-30 wt. % Cu-10 wt. % Sn or 72 wt. % Ag-28 wt. % Cu which has melting temperatures greater than the temperature of the fluids used in the heat exchanger.

An alternate embodiment of the present invention is shown in FIGS. 4 and 5 where the twisted tape 20 within the tube 12 is of the open core type, i.e., a central passageway is provided through the center of the tube with the helically wound tape providing primarily turbulence promotion for enhancing the heat exchange between the fluid within the tube and the tube walls. As in the case of the embodiment shown in FIGS. 1–3, the brazing of the open-cored tape to the inner wall 15 of the tube by a continuous braze joint provides enhanced thermal conductivity and heat transference from the fluid within the tube to the tube. The filler metal 22 and 24 is placed on the open-cored tape 20 at a location near the inner peripheral surface thereof as shown in FIG. 5. However, the particular location of the filler metal 22 and 24 is not as critical as in the FIGS. 1–3 embodiment since the filler will flow in only one direction with the open-cored tape whereas the filler metal flows in both directions with the solid-core tape. The filler metal 22 and 24 may be attached to the tape 20 in any suitable manner such as by spaced-apart tack joints prior to the insertion of the tape into the tube 12. As in the FIG. 1 embodiment, the tube 12 and the tape 20 are heated sufficiently to melt the filler metal 22 and 24 for effecting the wicking action of the filler metal toward the inner wall 15 of the tube for providing the desired continuous braze joint along the length of the tape common with the tube.

It will be seen that the present invention provides a procedure for brazing twisted tapes in relatively long tubes for enhancing heat transfer between the fluid in the tubes and a fluid medium external of the tubes.

What is claimed is:

1. In the art of fabricating a heat exchange structure formed of a tube containing therein an elongated convoluted tape having peripheral surfaces thereof disposed in a contiguous relationship with and attached to an inner wall surface of the tube, the method for brazing the convoluted tape to the inner wall of the tape comprising the steps of:

providing the convoluted tape with an elongated wire of brazing filler metal coextensive with the tape at a location contiguous with the radially innermost surface of the tape, inserting the tape and wire disposed thereon into the tube;

sufficiently heating the tube and tape to melt the filler metal and effect displacement of the filler metal to the peripheral edges of the tape by capillary attraction and thereby effect contact of the filler metal with the inner wall surface of the tube; and thereafter terminating the heating to solidify the filler metal to effect the joining of the tape to the tube over the common length thereof.

2. The method claimed in claim 1 wherein the convoluted tape is of the solid-core type, and wherein the wire of filler metal is disposed along the central longitudinal axis of the tape in a convoluted configuration corresponding to that of the tape with said wire in contact with the tape over the length thereof.

3. The method claimed in claim 2 wherein a filler wire is disposed along the central axis of the tape on opposite sides thereof.

4. The method claimed in claim 1 wherein the convoluted tape disposed in the tube provides an open core through the tube, and wherein the wire of brazing filler metal is disposed at a radially innermost location on the tape prior to the melting thereof.

* * * * *